(12) United States Patent
Néron

(10) Patent No.: US 7,343,632 B2
(45) Date of Patent: Mar. 18, 2008

(54) INFLATABLE CRASH GARMENT FOR NON ENCLOSED VEHICLE RIDER

(75) Inventor: Réjean Néron, 2276, Chemin Ste-Foy #505, Ste-Foy (Québec) (CA) G1V 1S7

(73) Assignee: Réjean Néron, Québec (Québec)

( * ) Notice: Subject to any disclaimer, the term of this patent is extended or adjusted under 35 U.S.C. 154(b) by 341 days.

(21) Appl. No.: 10/535,993

(22) PCT Filed: Dec. 19, 2002

(86) PCT No.: PCT/CA02/01971

§ 371 (c)(1),
(2), (4) Date: May 25, 2005

(87) PCT Pub. No.: WO2004/056224

PCT Pub. Date: Jul. 8, 2004

(65) Prior Publication Data

US 2006/0053533 A1 Mar. 16, 2006

(51) Int. Cl.
*A41D 13/00* (2006.01)
(52) U.S. Cl. ............... 2/456; 2/DIG. 3; 280/728.1
(58) Field of Classification Search ............ 2/462, 2/DIG. 3, 908, 912, 455–468; 280/728.1, 280/730.1, 733
See application file for complete search history.

(56) References Cited

U.S. PATENT DOCUMENTS

| 3,330,510 | A | 7/1967 | Johnson |
|---|---|---|---|
| 3,921,944 | A | 11/1975 | Morrison |
| 3,930,667 | A | 1/1976 | Osuchowski et al. |
| 3,972,526 | A | 8/1976 | Cox, Jr. |
| 3,984,142 | A | 10/1976 | Van Valkenburgh |
| 4,059,852 | A | 11/1977 | Crane |
| 4,089,065 | A | 5/1978 | McGee |
| 4,227,717 | A | 10/1980 | Bouvier |
| 4,299,406 | A | 11/1981 | Thomas |
| 4,637,074 | A | 1/1987 | Taheri |
| 4,685,151 | A | 8/1987 | Kincheloe |
| 4,783,853 | A | 11/1988 | Zuber |
| 4,825,469 | A | 5/1989 | Kincheloe |
| 4,977,623 | A * | 12/1990 | DeMarco .................... 2/456 |
| 4,984,821 | A | 1/1991 | Kim et al. |
| 5,133,084 | A | 7/1992 | Martin |
| 5,259,070 | A | 11/1993 | De Roza |
| 5,500,952 | A * | 3/1996 | Keyes ........................ 2/465 |
| 5,535,446 | A | 7/1996 | Pusic |
| 5,568,902 | A | 10/1996 | Hurley, Jr. |

(Continued)

FOREIGN PATENT DOCUMENTS

DE 2855871 7/1980

(Continued)

*Primary Examiner*—Danny Worrell
(74) *Attorney, Agent, or Firm*—Ogilvy Renault LLP; Dominique Pomerleau

(57) ABSTRACT

The crash garment comprises an inner suit to be worn by a person and associated therewith, an inflatable flexible member. The inflatable member has a gas producing device capable of releasing gas and inflating the inflatable member when the person is suddenly separated from the vehicle. This is made possible by providing signals and controls that direct the gas producing device to start inflation of the flexible member. A valve is provided to deflate the inflated member a short predetermined time after inflation of the flexible member.

18 Claims, 8 Drawing Sheets

U.S. PATENT DOCUMENTS

| | | |
|---|---|---|
| 5,593,111 A | 1/1997 | Jackson et al. |
| 5,746,442 A | 5/1998 | Hoyaukin |
| 5,781,936 A | 7/1998 | Alaloof |
| 5,937,443 A | 8/1999 | Kageyama et al. |
| 6,032,299 A | 3/2000 | Welsh |
| 6,139,050 A | 10/2000 | Bultel et al. |
| 7,017,195 B2 * | 3/2006 | Buckman et al. ............... 2/455 |

FOREIGN PATENT DOCUMENTS

| | | |
|---|---|---|
| DE | 197 44 808 A1 | 4/1999 |
| FR | 1436724 | 3/1966 |
| JP | 03038309 | 4/1991 |
| JP | 09066789 | 3/1997 |
| JP | 11279813 | 10/1999 |
| WO | WO 01/81128 A1 | 11/2001 |

* cited by examiner

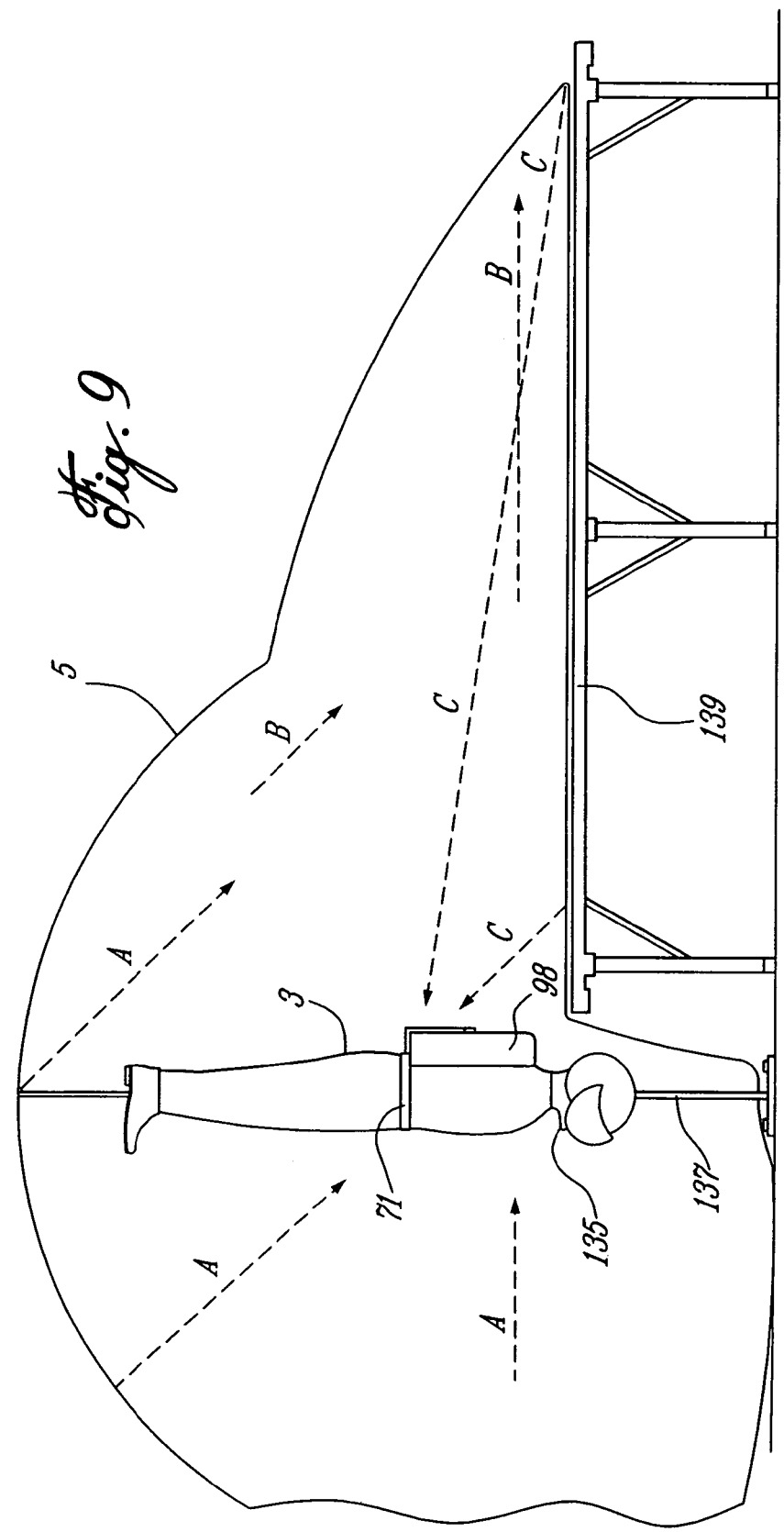

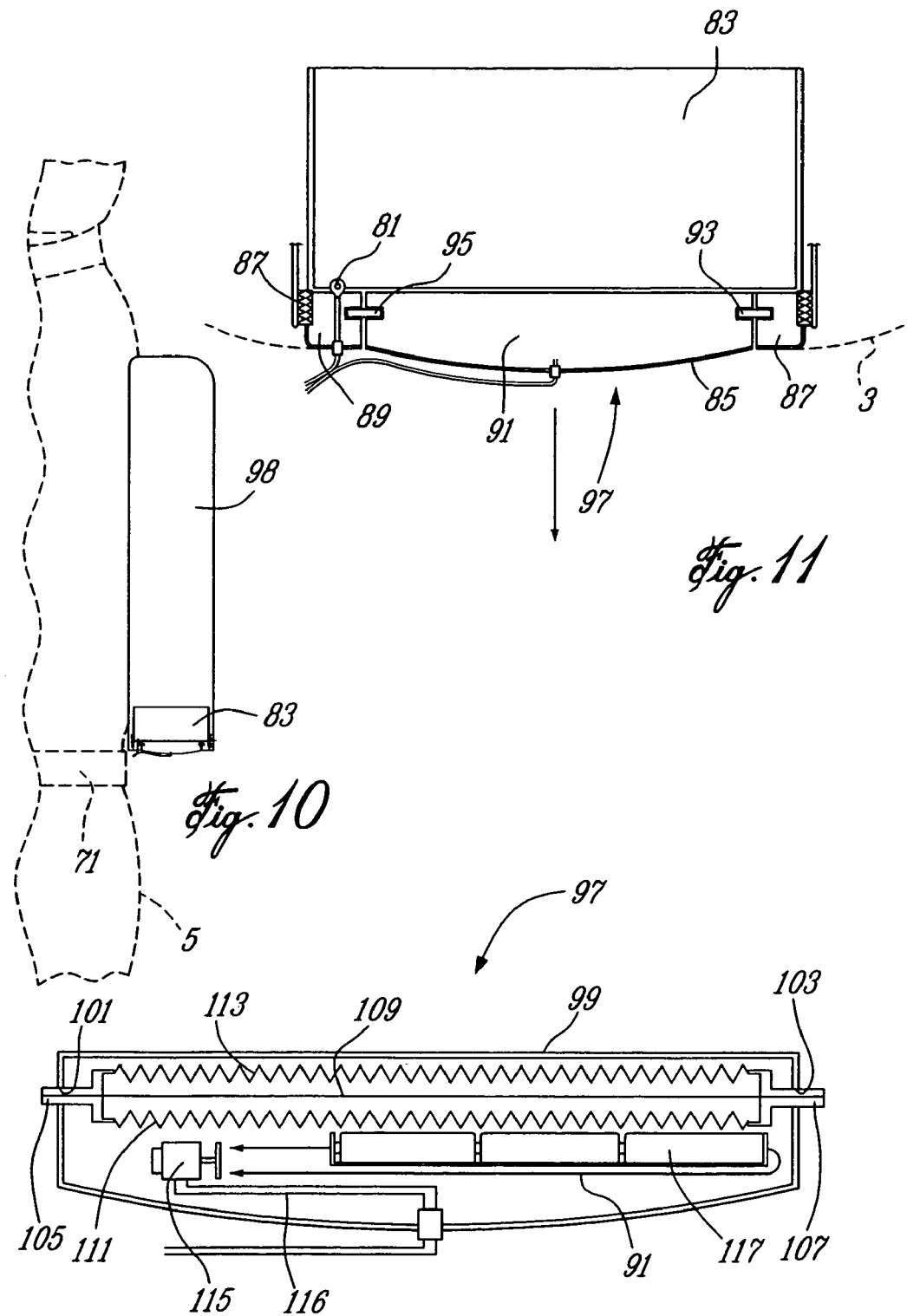

INFLATABLE CRASH GARMENT FOR NON ENCLOSED VEHICLE RIDER

TECHNICAL FIELD

The present invention relates to an inflatable crash garment for a person, such as a motorcyclist, riding a non enclosed vehicle. More particularly, the invention in concerned with a protective garment to be worn by the rider of a non enclosed vehicle, such as a motorcycle, a snowmobile, an ATV, or the like, and that is arranged to inflate and completely surround and protect the rider in case he is thrown out of the vehicle, after which the garment slowly deflates to prevent discomfort and/or injuries to the rider.

BACKGROUND ART

It is well known that motorcyclists in general are susceptible of sustaining relatively dangerous accidents. Indeed, not only is the motorcycle a relatively unstable vehicle but the motorcycle rider is left with little protection from the vehicle in the event of an accident, a crash or the like. The same applies to any non enclosed vehicle, such as a snowmobile or an ATV.

Accordingly, it is common practice for motorcyclists to attempt to protect themselves from injuries by wearing a protective headgear, such as a safety helmet or the like. Also, motorcycle riders typically wear a leather suit or the like intended primarily the minimize exterior friction causing damage to the surface portion of the motorcyclist's body if the latter is thrown from the motorcycle during an accident.

Such relatively thick leather surfaced garments may provide a minor degree of cushioning effect, but this is very limited in magnitude and is relatively ineffective. Indeed, while such clothing may be quite protective against abrasion, the impact protection provided thereby is very limited as substantial padding is impractical.

In other fields such as in the field of automobiles, it has now become current practice to provide inflatable devices such as inflatable bags, often called air bags that are inflated automatically in the event of a crash. Where such devices are proposed for crash protection, they are designed to protect the rider while in the vehicle, and not in the event he/she jumps or is thrown from it.

An adequate inflatable crash protection device for motorcycle riders must satisfy a number of conditions that are entirely different front those desired for automobile crash protection. Indeed, motorcycles seldom strike obstacles directly head on.

Motorcyclists usually attempt to avoid the crash and therefore, the conventional automobile air bags mounted on conventional motorcycles would seldom afford adequate protection. Although it is rarity for an automobile driver or passenger to be thrown from the car in the event of a crash, the reverse is true for the motorcyclist who almost invariably jumps or is thrown from the motorcycle in the event of a crash of sufficient magnitude. Also, motorcyclists will often anticipate a crash a considerable time before it takes place. In many instances the motorcyclist can take evasive action to reduce the speed or minimize the crash. Frequently the motorcyclist will elect to jump clear of the motorcycle just before the crash.

Accordingly, there exists a need for a crash protection device specifically adapted for use with motorcycles, snowmobiles, ATV or the like wherein the vehicle itself affords scant protection to the rider in the event of a crash or collision.

It is an object of the present invention to provide a device that is specifically adapted to give full body protection against potential injuries resulting from impact between a rider of a non enclosed vehicle and its environment in crash and other emergency situations.

It is another object of the present invention to provide a device that is adapted to temporarily protectively surround the rider and provides a cushioning barrier for the rider.

It is another object of the present invention to provide a device that is provided with a trigger means adapted to selectively trigger an inflation or other type of deployment of a cushioning structure upon sensing predetermined dangerous conditions.

It is another object of the present invention to provide a device that allows a deployed cushioning component to gradually deflate the garment according to a predetermined time pattern.

It is another object of the present invention to provide a device that is specifically designed so as to be easily retro-fitted or originally mounted to conventional types of motorcycles or the like vehicles without altering their overall aesthetical and functional aspects and without substantially increasing the manufacturing cost thereof.

DISCLOSURE OF INVENTION

The above and other objects of the invention may be achieved by providing an inflatable crash garment to be worn by a person when riding a non enclosed vehicle. The inflatable crash garment comprises:

an inner suit shaped to cover the arms, legs and body of that person;

an inflatable flexible member adapted to be inflated;

means to join the inflatable flexible member to the inner suit such that the flexible member surrounds the inner suit;

gas producing means associated with the inflatable flexible member and activating means to cause the gas producing means to release gas therefrom;

signal means provided on the vehicle, the signal means being indicative of the presence of at least one person on the vehicle when the latter travels in excess of a predetermined speed;

control means carried by that person and coupled on the one hand to the signal means and on the other hand to the gas producing means, so constructed and arranged that when the vehicle travels in excess of the predetermined speed and the control means is suddenly uncoupled from the signal means when that person is forced out of the vehicle, the control means operate to direct the activating means to act on the gas producing means to release gas and inflate the flexible member all around the inner suit and that person; and valve means provided on that flexible member and arranged to slowly deflate same after the latter has been completely inflated.

The invention also relates to a method of preparing a crash garment ready to be worn by a person when riding a non enclosed vehicle. The method comprises:

providing a dummy and fixing same in upright up side down position at one end of a table;

providing an inner suit shaped to cover the arms, legs and body of the dummy and joining same to an inflatable flexible member that is adapted to be inflated into a spherical shape, in a manner that the flexible member surrounds the inner suit, the inner suit being provided with a pocket to contain the inflatable flexible member after folding same;

mounting control means as defined above over the dressed dummy;

dressing the dummy with the inner suit and joining the inflatable flexible member to the inner suit;

spreading the inflatable flexible member over the table, folding same and introducing it into the pocket;

connecting the gas producing means and the valve means as defined above to the pocket; and, removing the garment from the dummy so that the crash garment is ready to be worn by that person.

According to a general aspect, there is provided an inflatable crash garment for a non-enclosed vehicle rider. The inflatable crash garment comprises: an inner suit shaped to cover arms, legs, and body of the rider; an inflatable flexible membrane connected to the inner suit, configurable into a folded non-inflated configuration surrounding the inner suit and an inflated configuration having a substantially single spherical shape enclosing head and leg and arm extremities of the rider, and having at least one valve configurable into an open configuration slowly deflating the flexible membrane after the latter has been configured into the inflated configuration; a sensor operatively connected to the vehicle and providing an indicator of the presence of the rider on the vehicle when the vehicle has a travel speed above a predetermined speed; a controller connected to the sensor in the folded non-inflated configuration of the flexible membrane and disconnected from the sensor when the rider is forced out of the vehicle; and a gas supply in fluid communication with the inflatable flexible membrane and connected to the controller, the gas supply being activated to release gas and inflate the inflatable flexible membrane into the inflated configuration when the controller is disconnected from the vehicle sensor and the travel speed of the vehicle is above the predetermined speed.

According to another general aspect, there is provided an inflatable crash garment to be worn by a person when riding a non enclosed vehicle. The inflatable crash garment comprises: an inner suit shaped to cover arms, legs and body of said person; an inflatable flexible member adapted to be inflated and including a pair of octagonal members, each octagonal member having generally triangular cuts with inwardly merging curved lateral sides formed at junctions between all sides of said octagonal member, said generally triangular cuts extending short of center of said octagonal member, a star shaped portion removed at said center, said lateral sides being joined together to convert said octagonal member into a semi-spherical member with said star shaped portion merging into said center, said semi-spherical members being joined to constitute a spherical inflatable flexible member; means to join said inflatable flexible member to said inner suit such that said flexible member surrounds said inner suit; gas producing means associated with said inflatable flexible member and activating means to cause said gas producing means to release gas therefrom and inflate said flexible member; signal means provided on said vehicle, said signal means being indicative of the presence of at least one said person on said vehicle when the latter travels in excess of a predetermined speed; control means carried by said person and coupled on the one hand to said signal means and on the other hand to said gas producing means, so constructed and arranged that when said vehicle travels in excess of said predetermined speed and said control means is suddenly uncoupled from said signal means when said person is forced out of said vehicle, said control means then operates to direct said activating means to act on said gas producing means to release gas and inflate said flexible member all around said inner suit and said person; and, valve means provided on said flexible member and arranged to slowly deflate same after the latter has been completely inflated.

According to another general aspect, there is provided an inflatable crash garment to be worn by a person when riding a non enclosed vehicle. The inflatable crash garment comprising: an inner suit shaped to cover arms, legs and body of said person; an inflatable flexible member adapted to be inflated; means to join said inflatable flexible member to said inner suit such that said flexible member surrounds said inner suit; gas producing means associated with said inflatable flexible member and activating means to cause said gas producing means to release gas therefrom and inflate said flexible member; signal means provided on said vehicle, said signal means being indicative of the presence of at least one said person on said vehicle when the latter travels in excess of a predetermined speed; control means carried by said person and coupled on the one hand to said signal means and on the other hand to said gas producing means, so constructed and arranged that when said vehicle travels in excess of said predetermined speed and said control means is suddenly uncoupled from said signal means when said person is forced out of said vehicle, said control means then operates to direct said activating means to act on said gas producing means to release gas and inflate said flexible member all around said inner suit and said person; a belt adapted to be worn around waist of said person and containing said control means, said control means being coupled to said signal means by means of a coupling cord; and valve means provided on said flexible member and arranged to slowly deflate same after the latter has been completely inflated.

BRIEF DESCRIPTION OF DRAWINGS

FIG. 9 is a schematic side view showing how to prepare an inner suit with an inflatable flexible member, and to store same in a pocket provided with the inner suit;

FIG. 10 is a side view showing the pocket with associated gas producing and valve means;

FIG. 11 is a view of the bottom of the pocket showing the valve means;

FIG. 12 is a schematic cross-section view showing details of the valve means; and, FIG. 13 is a side view of a motorcycle as modified to accommodate a crash garment according to the invention.

MODES OF CARRYING OUT THE INVENTION

Figure 1:
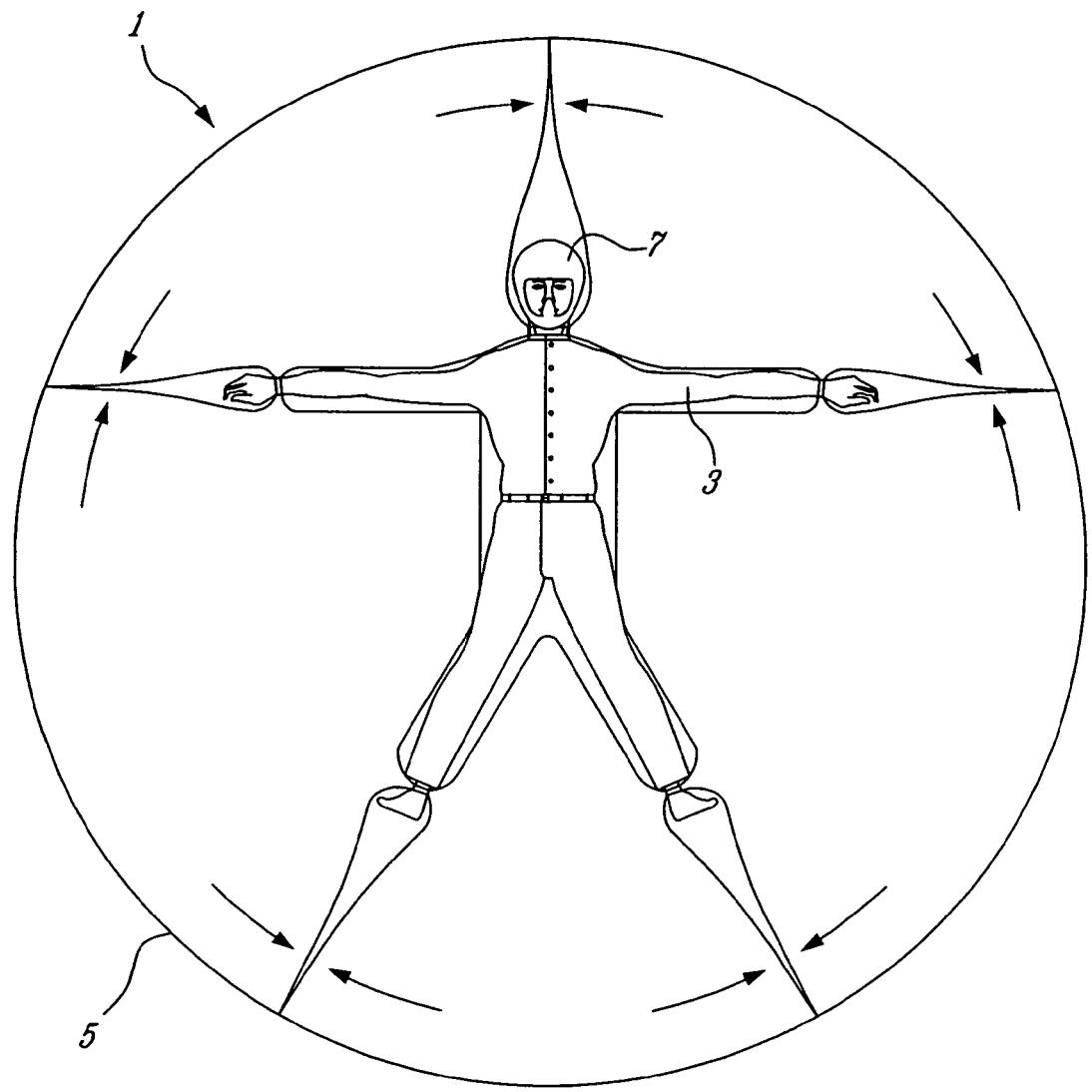
FIG. 1 is a schematic view of a protective garment according to the invention, in inflated condition also showing a motorcyclist wearing same.
Figure 2:
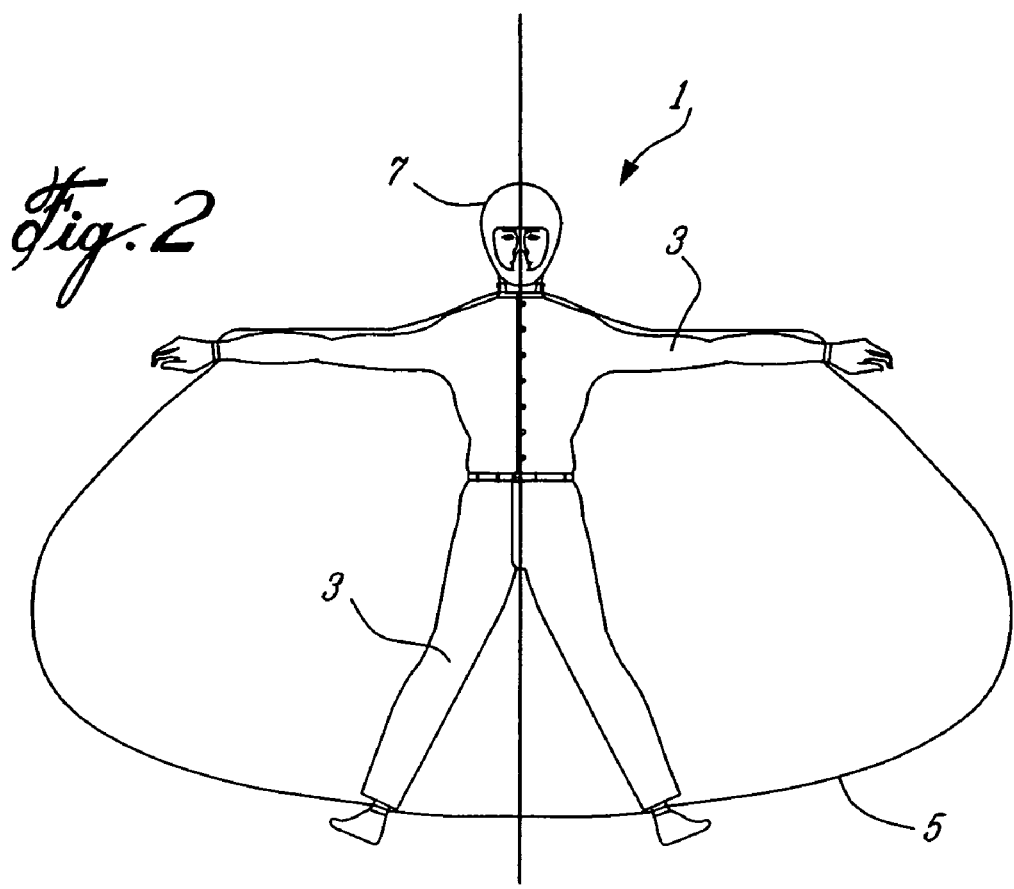
FIG. 2 is schematic view showing the motorcyclist and the protective garment in deflated condition.

With reference to the drawings, more particularly FIGS. 1 and 2, there is shown a crash garment 1 according to the invention which mainly comprises an inner suit 3 and an inflatable flexible member 5. In FIGS. 1 and 2, inner suit 3 is shown as being worn by a motorcyclist 7, although this suit can be worn by the rider of any non enclosed vehicle, or by a passenger of the motorcycle or other non enclosed vehicle. In FIG. 1, crash garment 1 is illustrated with inflatable flexible member 5 in full inflated condition, such as immediately following an ejection of the motorcyclist from his vehicle. It will also be seen that in inflated condition, inflatable flexible member 5 becomes essentially spherical as will be seen later. Of course, any other inflated shape can be adopted within the spirit of the present invention, although a spherical shape is much preferred in view of the aims to be reached by the present invention, namely protection upon impact, and the progressive dispersion of kinetic energy. Turning now to FIG. 2, the latter shows the same garment in deflated condition, such as a few seconds, for example 10 seconds, after inflation of flexible member 5. As shown, FIG. 2 is indicative of the deflation that takes place.

It must be realized that after the motorcyclist has been thrown out or has jumped from his motorcycle, the flexible member will immediately be inflated as a result of a substantial positive pressure created inside flexible member 5 as will be discussed in detail later. Such positive pressure would of course be harmful to the motorcyclist if allowed to persist for any length of time. This is the reason why after inflation, a mechanism, such as a valve, that will be described in detail later, will immediately cause the inflated flexible member shown in FIG. 1 to deflate as shown in FIG. 2.

Obviously, inner suit 3 and flexible member 5 must be combined into a unitary member to be operational. Before achieving this, it is necessary to describe both inner suit 3 and flexible member 5 in detail.

Figure 3:
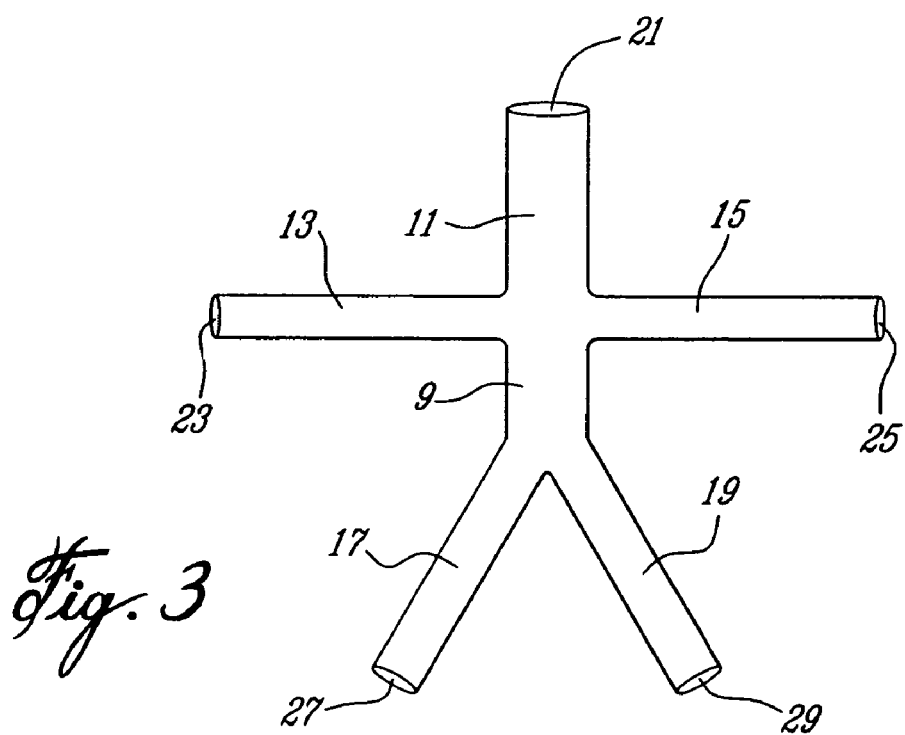
FIG. 3 is a schematic view of an inner suit according to the invention.

Inner suit 3 is schematically illustrated in FIG. 3. It may look like a diver's suit and is normally made of nylon, or any other suitable material as will be appreciated by one skilled in the art. Of course, any suitable shape can be used and the particular choice thereof is left entirely to the expert in the art. The suit is formed with a body portion 9, neck portion 11, arm portions 13, 15 and leg portions 17, 19. Each of the above neck, arm and leg portions are terminated by respective neck opening 21, arm openings 23, 25 and leg openings 27, 29.

Figure 4A:
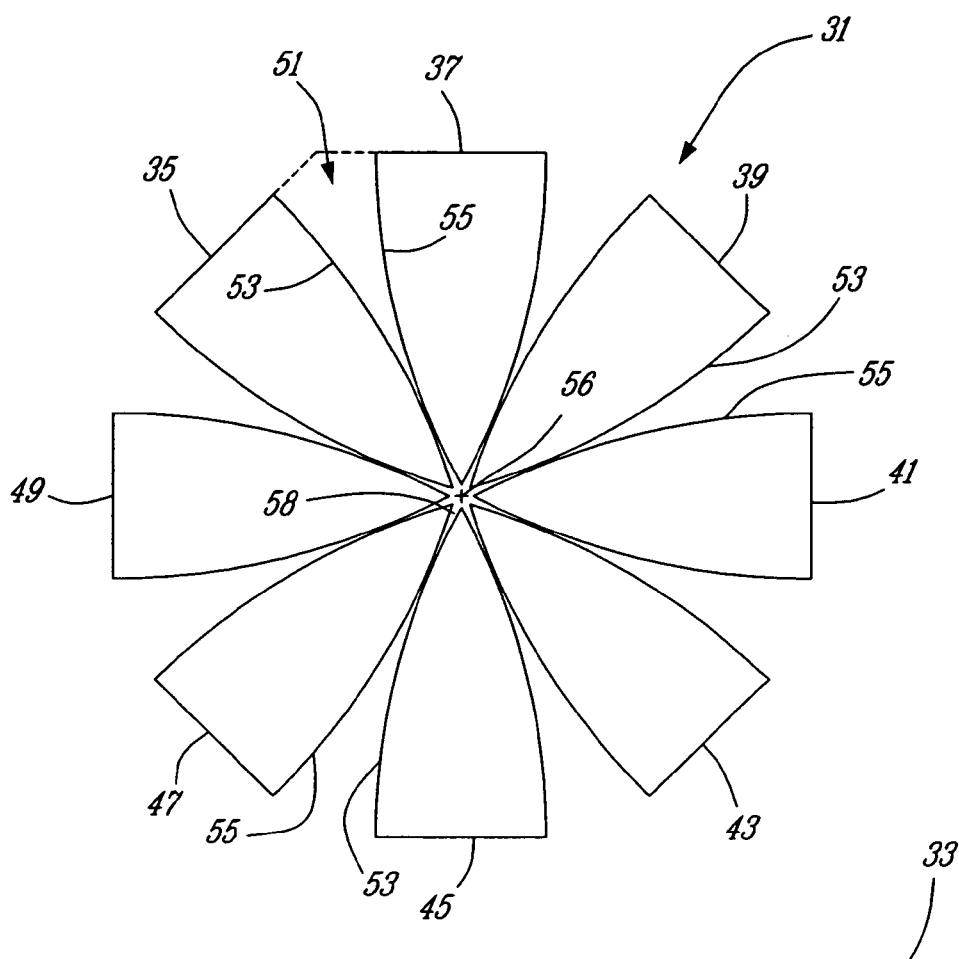
FIGS. 4A and 4B are plan views of the two portion members used to form an inflatable flexible member according to the invention.
Figure 4B:
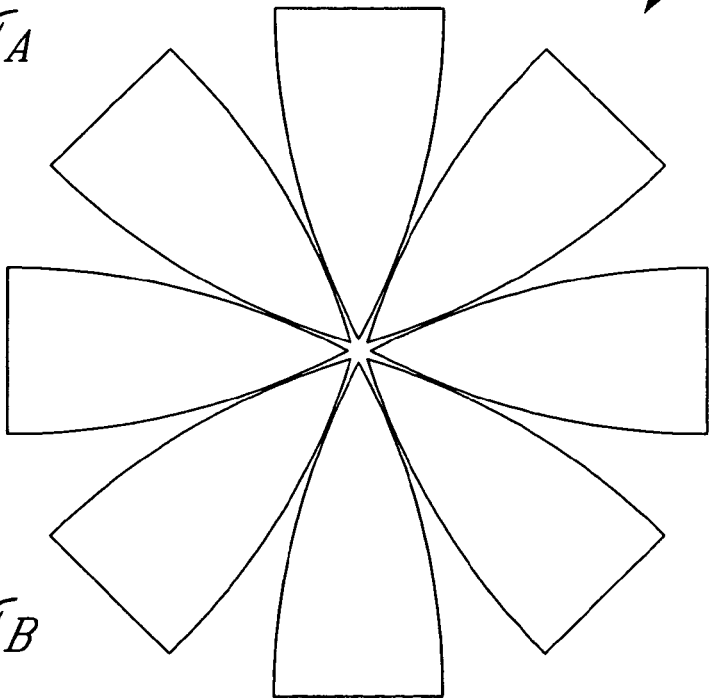
Figure 5:
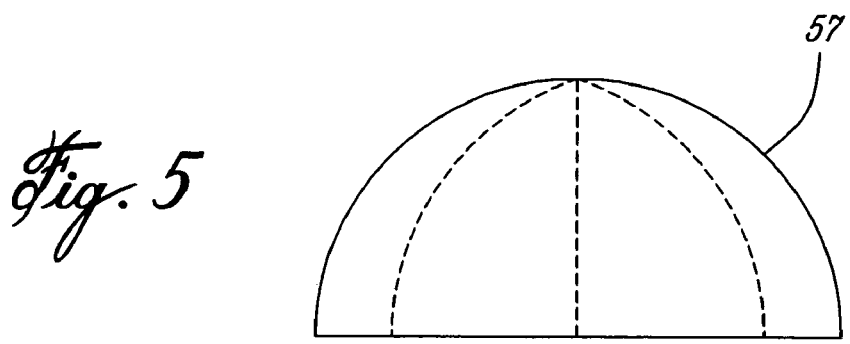
FIG. 5 is a side view of one portion member illustrated in FIG. 4 as formed into a spherical member.

Turning now to inflatable flexible member 5, the latter is made of two portion members 31 and 33 as shown in FIG. 4. More particularly, the two portion members are identical and in order to be formed, each into a semi-spherical element, they are generally octagonal. Reference will now be made to portion member 31, it being understood that the description will also apply to portion member 33 that is identical to portion member 31. More specifically, portion member 31 is an octagon of suitable dimensions, such as 5.5 meters from one side to the opposite side. The sides of octagonal portion member 31 are identified by reference numerals 35, 37, 39, 41, 43, 45, 47 and 49, as shown. Octagonal portion member 31 is cut from an octagon whose sides, before cutting the octagon, are shown in completed form in dotted lines in FIG. 4. Taking for example, sides 35 and 37, as completed by the dotted lines, a generally triangular cut 51, shaped as illustrated, is performed by any known means at the junction between sides 35 and 37, wherein lateral sides 53, 55 are inwardly merging so that the cut extends short of center 56 of the octagon. In addition, to ensure the proper folding of portion member 31, into a semi-spherical member, a star shaped portion 58 is removed from the center 56 of portion member 31. When this is done, all the lateral sides 53 are joined respectively to lateral sides 55, and star shaped portion 58 is allowed to merge into center 56, to constitute a semi-spherical portion 57 of the inflatable flexible member 5, all as shown in FIG. 5 of the drawings. The operation is repeated with portion member 33 to constitute the second semi-spherical portion 59.

Figure 6:
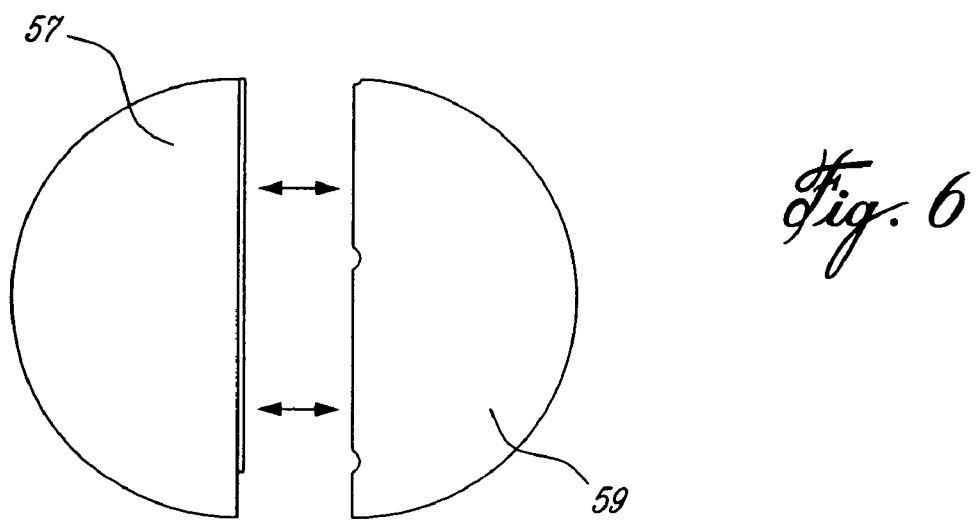
FIG. 6 is a schematic side view showing the connection of two portion members to constitute the spherical member.
Figure 7:
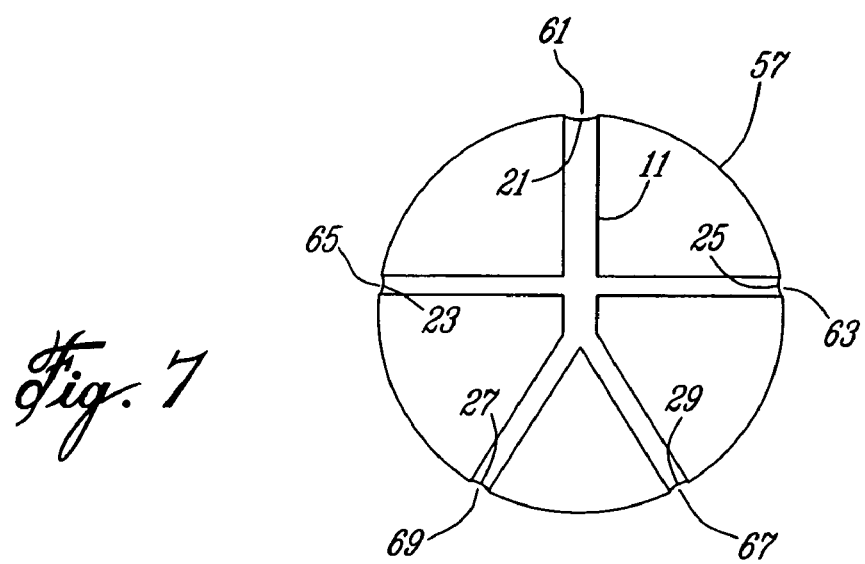
FIG. 7 is a schematic view showing the inner suit connected to one portion member through led, arm and neck ends thereof.

In order to assemble inner suit 3 with inflatable member 5, semi-circular cuts 61, 63, 65, 67 and 69 are formed as shown in FIG. 7 along the edge of semi-spherical portion 57. Then, inner suit 3 is disposed over semi-spherical portion 57 as shown with neck opening 21, arm openings 23, 25 and leg openings 27, 29 respectively placed opposite circular cuts 61, 63, 65, 67 and 69 where the openings are adhesively bonded such as by thermofusion or the like into the semi-circular cuts to provide outlets for the head, hands and feet of the rider. Once this is done, semi-spherical portion 59 is joined to semi-spherical portion 57 by any known means to constitute crash garment 1. This is shown in FIG. 6.

It should be noted here that neck portion 11 must be large enough to enable a person to put on the garment by sliding through opening 21 provided at the neck portion.

Figure 8:
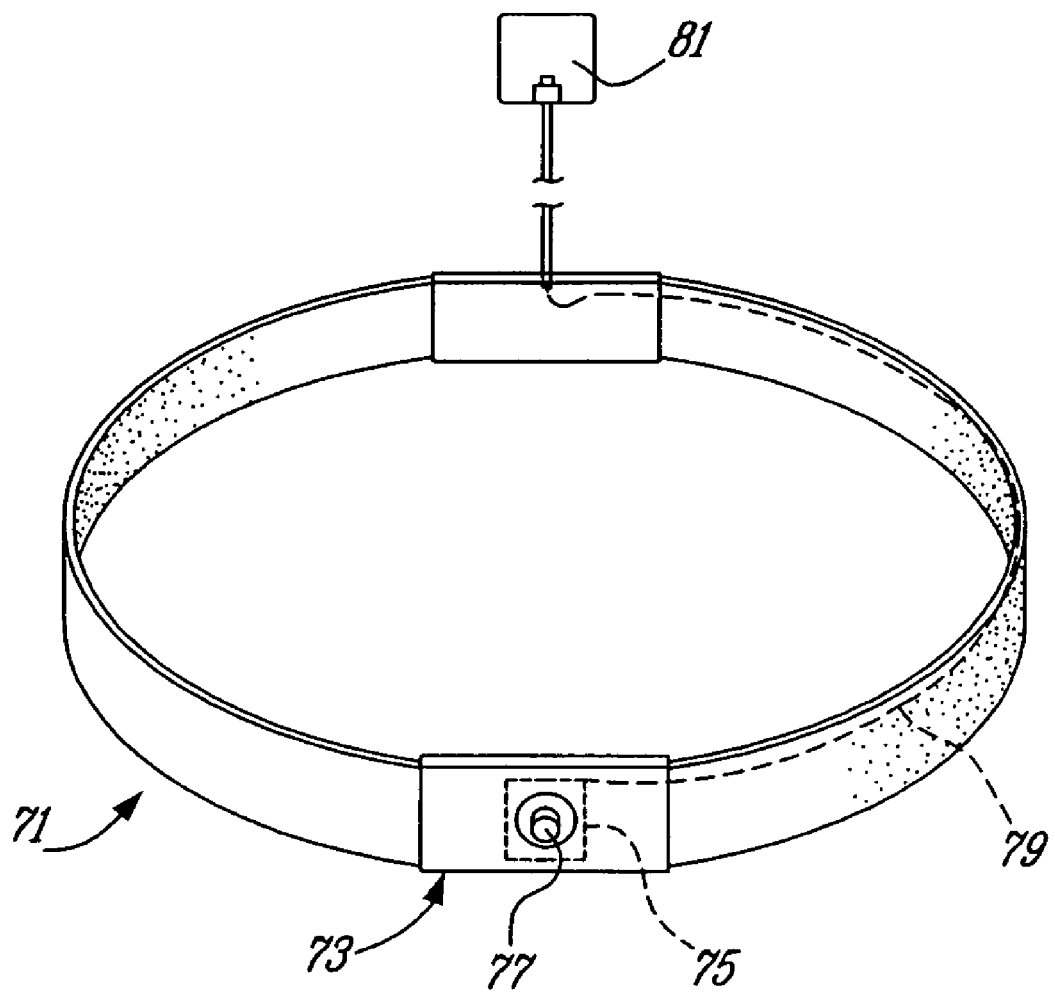
FIG. 8 is a perspective view of a belt containing control means to be worn over the inner suit.

To complete the garment, there is provided a belt 71, illustrated in FIG. 8, that will be described more in detail later, a pocket 73, illustrated in FIG. 10, that is integral with inner suit 3 and is adapted to contain inflatable flexible member 5 after the latter has been folded as will be described later, and a pressurized gas producing device as well as a valve to release the pressure once inflatable flexible member 5 has been inflated when the rider has been separated from his vehicle.

As shown in FIG. 10, Belt 71 is adapted to be worn around the waist of the rider over inner suit 3. Turning now to FIG. 8, it will be seen that belt 71 has a belt buckle 73 having a protective casing 75 mounted thereto to protectively enclose an electronic circuitry and power means not shown. The electronic circuitry is electrically coupled to a suitable connection, here a magnetized coupler 77 that is centrally disposed on belt buckle 73. The electronic circuitry within casing 75 is also electrically coupled in known manner through cable connection 79, shown in dotted line, and mounted within the body of the belt to an electrical igniter 81 that is disposed inside a block of explosive material 83 (FIG. 11), such as nitrocellulose, which is associated with pocket 98.

As shown, nitrocellulose block 83 as well as valve 85 to be described later are all mounted inside inflatable flexible member 5. In other words, the assembly comprising block 83 and valve 85 is arranged in known manner to project interiorly of inflatable flexible member 5. More specifically, valve 85 that will be described in more detail later, is fixedly mounted at the base of block 83 through toothed device 87, although any other type of attachment may be used as will be appreciated by one skilled in the art. Valve 85 comprises a casing 89 and a valve body 91 that is illustrated in detail in FIG. 12. Casing 89 is engaged with nitrocellulose containing block 83 by means of toothed device 87 and is provided with a pair of prong recesses 93, 95 to hold valve mechanism 97 as will now be discussed. This arrangement is mounted in pocket 98 along with inflatable flexible member 5.

With reference to FIG. 12, it will be seen that valve mechanism 97 consists of a rectangular enclosure 99 that is provided with two oppositely mounted prong openings 101 and 103 on opposite sides thereof, as shown. Inside the enclosure, there is a system consisting of two opposite prongs 105, 107 that are fixed at the end of a rod filament 109. In addition, two inwardly retractable springs 111 and 113 are disposed between prongs 105, 107, and are fixed thereto at both ends of rod filament 109. A controller 115 mounted inside enclosure 99 and connected to battery 117 is electrically connected to rod filament 109 to cause melting of rod filament 109, a predetermined period, such 10 seconds, after inflation of inflatable flexible member 5. Also as shown, controller 115 is connected through connection 116 to the control provided by the circuitry that is disposed in belt 71.

Figure 13:
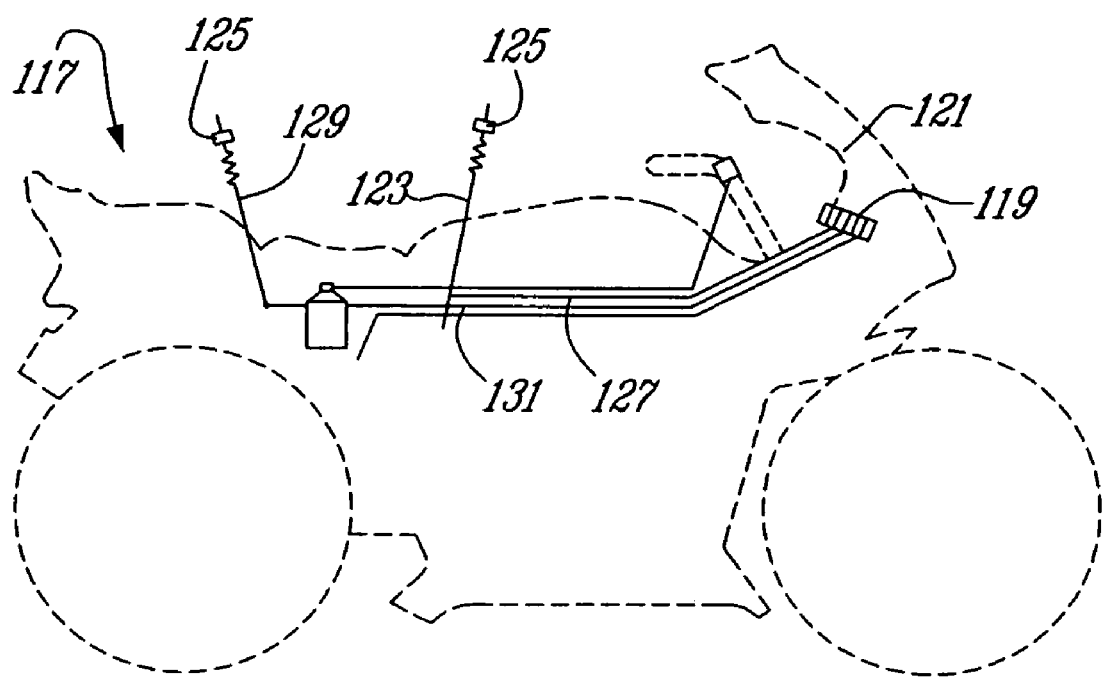

Crash garment 1 according to the invention, is adapted to be used with a non enclosed vehicle, here a motorcycle 117 that has been slightly modified to accommodate a motorcyclist wearing a crash garment according to the invention. More specifically, and as illustrated in FIG. 13, there is provided a controller component 119 that is positioned adjacent the dashboard 121 of the motorcycle. Further details about controller component 119 will be given later. Other modifications to motorcycle 117 include a coupling cord 123 that is provided with a male type connector 125 to be connected to connector 77 (shown in FIG. 8). Coupling cord 123 is, in turn, linked to a central cord 127 that extends along the side of motorcycle 117 towards controller component 119. Optionally, but not necessarily, the illustrated embodiment includes a second connecting cord 129 that allows a second passenger to be electrically coupled to controller component 119 using an auxiliary wire 131.

The controller component 119 includes four visual signalling means (not shown) preferably each having color coding. A first set of two color coded lights is typically used for the conductor while a second set of two similar color coded lights is used for the passenger.

A main circuit (not shown) is mounted within the casing of the controller component 119. The main circuit receives signals from the electronic circuitry mounted within casing 75 of belt buckle 73. The main circuit detects the presence of a passenger through a contact sensor (not shown). The contact sensor is typically activated when the foot rests of the motorcycle 117 are deployed in their generally lowered and horizontal configuration. The controller component 119 is preferably powered by the conventional battery of the motorcycle 117.

In use, the rider first couples male connector 125 to magnetized connector 77 that is part of the belt buckle component 73. Once the electronic circuitry of the motorcycle is ignited and the motorcycle reaches, for example 15 km/h, the processor component part of the main circuitry receives a signal from the processor of the electronic circuitry mounted within casing 75 and lights up the typically green display on the dashboard of the motorcycle indicating that the protection system for the rider is operational. In the event that the passenger also rides the motorcycle and has connected his own magnetized connector 77 to cable 129, the typically green color coded light source of controller component 119 that is assigned to him is also lighted on the dashboard of the motorcycle to indicate that the protection system for the passenger is also operational.

In the event that electrical contact is not suitably established for either one of the occupants of the motorcycle and thus with either protection system not operational, the processor of the main circuit sends a signal to the typically red color coded indicator of either the passenger or the driver indicating malfunction of the corresponding protection system.

In the event of a collision crash or other situations wherein the passengers are abruptly separated from the motorcycle, the linking cords 123 and 129 will separate from their corresponding connector 77 attached respectively to the belt component of the rider and/or passenger. Since the electrical tension drops drastically, the electronic circuit within the protective casing 75 mounted to belt buckle 73 links battery 133 igniter 81 provided with block 83 of nitrocellulose. Igniter 81 ignites the nitrocellulose. The chemical reaction, in turn, liberates gases which inflate inflatable flexible member 5 to its inflated configuration shown in FIG. 1, typically within 1/50 of a second. Valve 91 allows the inflated membrane to deflate according to a predetermined time pattern as mentioned above. Typically, valve 91 is set so that the inflated configuration shown in FIG. 1 remains for a period substantially in the range of 10 seconds. The inflated membrane then deflates slowly by the action of valve 91 to the configuration shown in FIG. 2 so as to allow for the rider and passenger to step out therefrom.

With reference to FIG. 9, this is an illustration that shows how to prepare a crash garment according to the invention in a condition ready to be slipped on by a rider of a non enclosed vehicle. There is first prepared a dummy 135 that is placed up side down on a support 137. The combination of inner suit 3, dressed with belt buckle 71 and pocket 98, and inflatable flexible member 5 is mounted on dummy 135 through neck opening 21. Once inner suit 3 is completely fitted over dummy 135, inflatable flexible member 5 is drawn over table 139 where it is properly folded and inserted into pocket 98.

It is understood that the invention is not restricted to the preferred embodiment that has been described and that modifications are possible within the scope of the appended claims.

The invention claimed is:

1. Inflatable crash garment to be worn by a person when riding a non enclosed vehicle, said inflatable crash garment comprising:
   an inner suit shaped to cover arms, legs and body of said person;
   an inflatable flexible member adapted to be inflated into a single spherical shape simultaneously enclosing head and leg and arm extremities of said person;
   means to join said inflatable flexible member to said inner suit such that said flexible member surrounds said inner suit;
   gas producing means associated with said inflatable flexible member and activating means to cause said gas producing means to release gas therefrom and inflate said flexible member;
   signal means provided on said vehicle, said signal means being indicative of the presence of at least one said person on said vehicle when the latter travels in excess of a predetermined speed;
   control means carried by said person and coupled on the one hand to said signal means and on the other hand to said gas producing means, so constructed and arranged that when said vehicle travels in excess of said predetermined speed and said control means is suddenly uncoupled from said signal means when said person is forced out of said vehicle, said control means then operates to direct said activating means to act on said gas producing means to release gas and inflate said flexible member all around said inner suit and said person; and, valve means provided on said flexible member and arranged to slowly deflate same after the latter has been completely inflated.

2. Inflatable crash garment according to claim 1, wherein said inflatable flexible member is joined to inner suit at leg ends, arm ends and neck end thereof.

3. Inflatable crash garment according to claim 2, wherein said inflatable flexible member comprises a pair of octagonal members, each octagonal member having generally triangular cuts with inwardly merging curved lateral sides formed at junctions between all sides of said octagonal member, said generally triangular cuts extending short of center of said octagonal member, a star shaped portion removed at said center, said lateral sides being joined together to convert said octagonal member into a semi-spherical member with said star shaped portion merging into said center, said semi-spherical members being joined to constitute a spherical inflatable flexible member.

4. Inflatable crash garment according to claim 3, wherein leg openings, arm openings and neck opening are formed along an edge of one said semi-spherical member, the leg ends, arm ends and neck end of said inner suite being adhesively joined to said one semi-spherical member, respectively at said leg openings, arm openings and neck opening, said one semi-spherical member being thereafter adhesively sealed along said edge to a corresponding edge of the other semi-spherical member.

5. Inflatable crash garment according to claim 1, which comprises a belt adapted to be worn around waist of said person, said belt containing said control means, said control means being coupled to said signal means by means of a coupling cord.

6. Inflatable crash garment according to claim 5, wherein said pressurized gas producing means comprises an ignitable powder.

7. Inflatable crash garment according to claim 1 wherein said inner suit is formed with a pocket to contain said inflatable flexible member after folding same.

8. Inflatable crash garment according to claim 7, wherein said valve means is disposed at bottom of said pocket and is operatively connected thereto to initiate deflation of the inflated flexible member.

9. Inflatable crash garment according to claim 7, which comprises a seat to receive said valve means, said seat disposed at bottom of said pocket.

10. Inflatable crash garment according to claim 9, wherein said seat comprises oppositely mounted prong recesses, said valve means comprises a pair of opposite spring drawing prongs, a rod filament disposed between said spring drawing prongs to hold them in extended position when said prongs are placed inside corresponding recesses, and heat control means programmed to cause melting of said rod filament and disengagement of said prong from said recesses to open said valve means and cause deflation of the inflated flexible member a predetermined time after said flexible member has been inflated.

11. Method of preparing a crash garment ready to be worn by a person when riding a non enclosed vehicle which comprises:

providing a dummy and fixing same in upright up side down position at one end of a table;

providing an inner suit shaped to cover arms, legs and body of said dummy and joining same to an inflatable flexible member that is adapted to be inflated into a spherical shape, in a manner that said flexible member surrounds said inner suit, said inner suit being provided with a pocket to contain said inflatable flexible member after folding same;

dressing said dummy with said inner suit, and joining said inflatable flexible member to said inner suit;

spreading said inflatable flexible member over said table, folding same and introducing it into said pocket;

connecting the gas producing means, associated with said inflatable flexible member for inflating the latter and the valve means provided on said flexible member and arranged to slowly deflate same after the latter has been completely inflated, to said pocket;

mounting control means, couplable to signal means provided on said vehicle and to said gas producing means for releasing gas and inflating said flexible member upon activation, over dressed dummy; and, removing said crash garment from said dummy so that said crash garment is ready to be worn by said person.

12. Inflatable crash garment according to claim 1, wherein the flexible membrane is functionally independent from the inner suit when inflated by defining a single spherical chamber containing pressurized gas.

13. An inflatable crash garment for a non-enclosed vehicle rider, comprising: an inner suit shaped to cover arms, legs, and body of the rider;

an inflatable flexible membrane connected to the inner suit, configurable into a folded non-inflated configuration surrounding the inner suit and an inflated configuration having a substantially single spherical shape enclosing head and leg and arm extremities of the rider, and having at least one valve configurable into an open configuration slowly deflating the flexible membrane after the latter has been configured into the inflated configuration;

a sensor operatively connected to the vehicle and providing an indicator of the presence of the rider on the vehicle when the vehicle has a travel speed above a predetermined speed;

a controller connected to the sensor in the folded non-inflated configuration of the flexible membrane and disconnected from the sensor when the rider is forced out of the vehicle; and a gas supply in fluid communication with the inflatable flexible membrane and connected to the controller, the gas supply being activated to release gas and inflate the inflatable flexible membrane into the inflated configuration when the controller is disconnected from the vehicle sensor and the travel speed of the vehicle is above the predetermined speed.

14. An inflatable crash garment as claimed in claim 13, wherein the flexible membrane defines a single spherical chamber containing pressurized gas in the inflated configuration.

15. Inflatable crash garment to be worn by a person when riding a non enclosed vehicle, said inflatable crash garment comprising:

an inner suit shaped to cover arms, legs and body of said person;

an inflatable flexible member adapted to be inflated and including a pair of octagonal members, each octagonal member having generally triangular cuts with inwardly merging curved lateral sides formed at junctions between all sides of said octagonal member, said generally triangular cuts extending short of center of said octagonal member, a star shaped portion removed at said center, said lateral sides being joined together to convert said octagonal member into a semi-spherical member with said star shaped portion merging into said center, said semi-spherical members being joined to constitute a spherical inflatable flexible member;

means to join said inflatable flexible member to said inner suit such that said flexible member surrounds said inner suit;

gas producing means associated with said inflatable flexible member and activating means to cause said gas producing means to release gas therefrom and inflate said flexible member;

signal means provided on said vehicle, said signal means being indicative of the presence of at least one said person on said vehicle when the latter travels in excess of a predetermined speed;

control means carried by said person and coupled on the one hand to said signal means and on the other hand to said gas producing means, so constructed and arranged that when said vehicle travels in excess of said predetermined speed and said control means is suddenly uncoupled from said signal means when said person is forced out of said vehicle, said control means then operates to direct said activating means to act on said gas producing means to release gas and inflate said flexible member all around said inner suit and said person; and, valve means provided on said flexible member and arranged to slowly deflate same after the latter has been completely inflated.

16. Inflatable crash garment according to claim 15, wherein the flexible membrane is functionally independent from the inner suit when inflated by defining a single spherical chamber containing pressurized gas.

17. Inflatable crash garment to be worn by a person when riding a non enclosed vehicle, said inflatable crash garment comprising:

an inner suit shaped to cover arms, legs and body of said person;

an inflatable flexible member adapted to be inflated;

means to join said inflatable flexible member to said inner suit such that said flexible member surrounds said inner suit;

gas producing means associated with said inflatable flexible member and activating means to cause said gas producing means to release gas therefrom and inflate said flexible member;

signal means provided on said vehicle, said signal means being indicative of the presence of at least one said person on said vehicle when the latter travels in excess of a predetermined speed;

control means carried by said person and coupled on the one hand to said signal means and on the other hand to said gas producing means, so constructed and arranged that when said vehicle travels in excess of said predetermined speed and said control means is suddenly uncoupled from said signal means when said person is forced out of said vehicle, said control means then operates to direct said activating means to act on said gas producing means to release gas and inflate said flexible member all around said inner suit and said person;

a belt adapted to be worn around waist of said person and containing said control means, said control means being coupled to said signal means by means of a coupling cord; and valve means provided on said flexible member and arranged to slowly deflate same after the latter has been completely inflated.

18. Inflatable crash garment according to claim 17, wherein the flexible membrane is functionally independent from the inner suit when inflated by defining a single spherical chamber containing pressurized gas.

* * * * *